(12) United States Patent
Harada et al.

(10) Patent No.: US 9,293,768 B2
(45) Date of Patent: Mar. 22, 2016

(54) BATTERY ELECTRODE, METHOD OF PRODUCING THE SAME, NONAQUEOUS ELECTROLYTE BATTERY, BATTERY PACK, AND ACTIVE MATERIAL

(75) Inventors: Yasuhiro Harada, Yokohama (JP); Norio Takami, Yokohama (JP); Hiroki Inagaki, Kawasaki (JP); Keigo Hoshina, Yokohama (JP); Yuki Otani, Saku (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 603 days.

(21) Appl. No.: 13/197,303

(22) Filed: Aug. 3, 2011

(65) Prior Publication Data
US 2012/0058395 A1 Mar. 8, 2012

(30) Foreign Application Priority Data
Sep. 7, 2010 (JP) ................. 2010-200207

(51) Int. Cl.
*H01M 4/62* (2006.01)
*B05D 5/12* (2006.01)
*H01M 4/131* (2010.01)
*H01M 10/052* (2010.01)

(52) U.S. Cl.
CPC .............. *H01M 4/621* (2013.01); *H01M 4/131* (2013.01); *H01M 4/622* (2013.01); *H01M 10/052* (2013.01); *Y02E 60/122* (2013.01); *Y02P 70/54* (2015.11); *Y02T 10/7011* (2013.01)

(58) Field of Classification Search
CPC ........ H01M 4/62; H01M 4/621; H01M 4/622; H01M 4/131; H01M 10/052; B05D 5/12
USPC .......................................... 429/215
See application file for complete search history.

(56) References Cited

U.S. PATENT DOCUMENTS

| 2007/0292760 | A1 | 12/2007 | Patoux et al. | |
| 2008/0241705 | A1* | 10/2008 | Wakita et al. | 429/344 |
| 2009/0081534 | A1* | 3/2009 | Takami et al. | 429/149 |
| 2010/0092846 | A1 | 4/2010 | Inagaki et al. | |
| 2010/0216022 | A1* | 8/2010 | Sano et al. | 429/212 |
| 2011/0052994 | A1 | 3/2011 | Harada et al. | |

FOREIGN PATENT DOCUMENTS

| CN | 101356668 A | 1/2009 |
| CN | 101814596 A | 8/2010 |
| JP | 10-312803 | 11/1998 |
| JP | 2002-117851 | 4/2002 |
| JP | 2007-165061 | 6/2007 |
| JP | 2008-16381 | 1/2008 |

(Continued)

OTHER PUBLICATIONS

U.S. Appl. No. 13/071,018, filed Mar. 24, 2011, Keigo Hoshina, et al.

(Continued)

*Primary Examiner* — Karie O'Neill Apicella
(74) *Attorney, Agent, or Firm* — Oblon, McClelland, Maier & Neustadt, L.L.P.

(57) ABSTRACT

According to one embodiment, there is provided a battery electrode. The battery electrode includes a titanium oxide compound having a monoclinic titanium dioxide crystal structure and a basic polymer.

19 Claims, 7 Drawing Sheets

(56) References Cited

FOREIGN PATENT DOCUMENTS

| JP | 2008-34368 | 2/2008 |
|----|------------|--------|
| JP | 2008-117625 | 5/2008 |
| JP | 2010-61931 | 3/2010 |

OTHER PUBLICATIONS

U.S. Appl. No. 13/071,046, filed Mar. 24, 2011, Keigo Hoshina, et al.
U.S. Appl. No. 13/053,865, filed Mar. 22, 2011, Hiroki Inagaki, et al.
René Marchand, et al., "TiO$_2$(B) A New Form of Titanium Dioxide and the Potassium Octatitanate K$_2$Ti$_8$O$_{17}$", Material Research Bulletin, vol. 15, 1980, pp. 1129-1133.
Office Action issued Nov. 20, 2012 in Japanese Patent Application No. 2010-200207 (with English translation).
Combined Chinese Office Action and Search Report issued Nov. 4, 2013 in Patent Application No. 201110223661.7 (with English language translation).
Chinese Office Action issued Jul. 29, 2014, in China Patent Application No. 201110223661.7 (with English Translation).
Office Action issued May 15, 2015 in Chinese Patent Application No. 201110223661.7 (with English language translation).
Chinese Office Action issued Nov. 4, 2015, in corresponding Chinese Patent Application No. 201110223661.7 (with English-language Translation).

\* cited by examiner

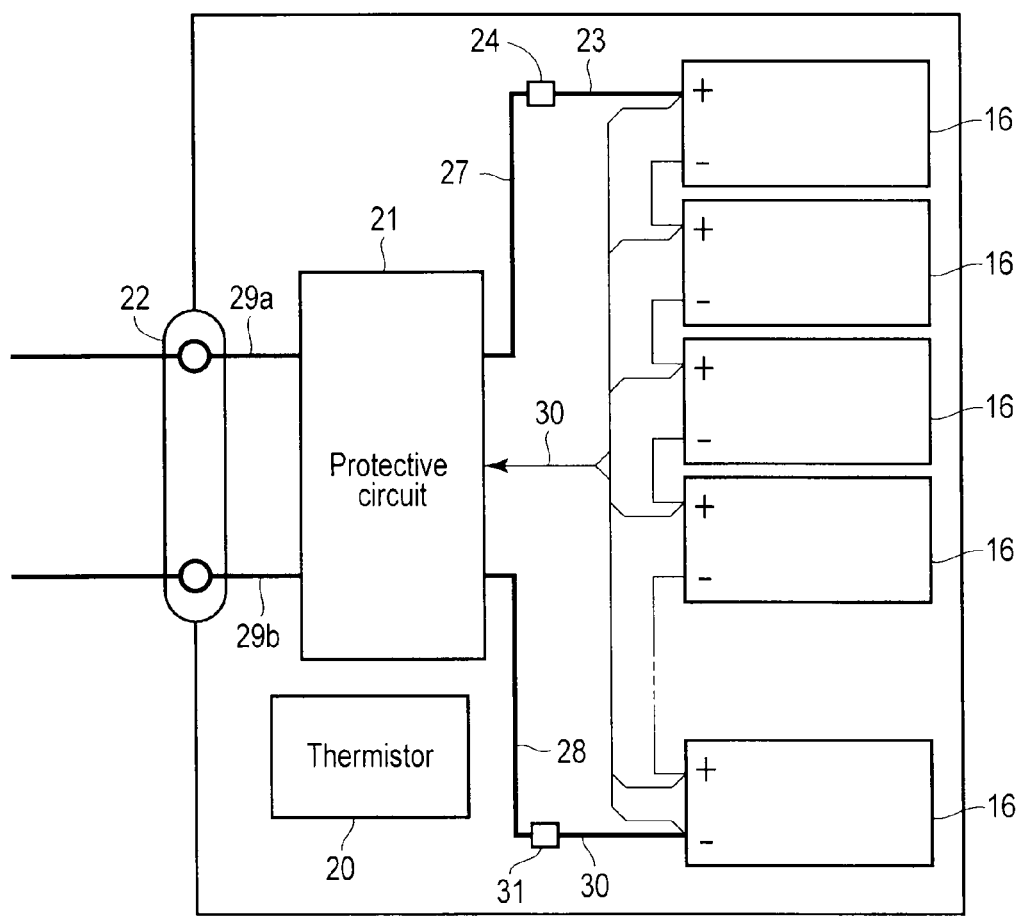
F I G. 9

BATTERY ELECTRODE, METHOD OF PRODUCING THE SAME, NONAQUEOUS ELECTROLYTE BATTERY, BATTERY PACK, AND ACTIVE MATERIAL

CROSS-REFERENCE TO RELATED APPLICATIONS

This application is based upon and claims the benefit of priority from Japanese Patent Application No. 2010-200207, filed Sep. 7, 2010; the entire contents of which are incorporated herein by reference.

FIELD

Embodiments described herein relate generally to a battery electrode, a method of producing the battery electrode, a nonaqueous electrolyte battery, a battery pack, and an active material.

BACKGROUND

A nonaqueous electrolyte battery using titanium oxide as the negative electrode enables stable and rapid charge/discharge and also has a longer life than a battery using a carbon type negative electrode. However, titanium oxide has a higher potential with respect to metal lithium than carbonaceous materials. Also, titanium oxide has a low capacity per weight. Therefore, a battery using titanium oxide as the negative electrode has a low energy density.

The theoretical capacity of titanium dioxide having an anatase structure is about 165 mAh/g and that of a lithium-titanium composite oxide having a spinel structure, such as $Li_4Ti_5O_{12}$, is about 170 mAh/g. On the other hand, the theoretical capacity of a graphite type electrode material is 385 mAh/g or more. The capacitance density of titanium oxide is significantly lower than that of a carbon type negative electrode material as mentioned above. This is due to reduction in substantial capacity because the number of lithium absorbing sites is small in the crystal structure of titanium oxide and lithium tends to be stabilized in the structure.

In light of this, a titanium oxide compound having the crystal structure of a monoclinic titanium dioxide has recently attracted attention. Monoclinic titanium dioxide can release/absorb a maximum of 1.0 of lithium ion per one titanium ion, and therefore, a titanium dioxide compound having the crystal structure of monoclinic titanium dioxide has a theoretical capacity of about 330 mAh/g, which is significantly higher than those of other titanium oxide compounds.

However, when a titanium oxide compound having the crystal structure of monoclinic titanium dioxide is used as an electrode material, the performance of a battery is significantly deteriorated, giving rise to the problem as to reduced the cycle life.

BRIEF DESCRIPTION OF THE DRAWINGS

FIG. 9 is a block diagram showing the electric cycle of a battery pack of FIG. 8.

DETAILED DESCRIPTION

In general, according to embodiments, there is provided a nonaqueous electrolyte battery improved in cycle life, a battery electrode used in the battery, a method of producing the battery electrode, a battery pack and an active material used in these electrode and battery pack.

According to one embodiment, a battery electrode is provided which comprises a titanium oxide compound having the crystal structure of monoclinic titanium dioxide and a basic polymer.

According to another embodiment, there is provided a method of producing an electrode, the method comprising reacting an alkali titanate compound with an acid to exchange an alkali cation for a proton, thereby forming a protonic titanate compound; heating the protonic titanate compound to produce titanium oxide compound particle having a monoclinic titanium dioxide crystal structure; and making a basic polymer exist on the surface of the titanium oxide compound particle.

According to a further embodiment, there is provided a nonaqueous electrolyte battery comprising the above battery electrode as the negative electrode, a positive electrode and a nonaqueous electrolyte.

According to a further embodiment, there is provided a battery pack comprising a nonaqueous electrolyte battery.

According to a further embodiment, there is provided an active material comprising titanium oxide compound particle having the crystal structure of monoclinic titanium dioxide and a basic polymer used to coat at least a part of the surface of the titanium oxide compound particle therewith.

Figure 1:
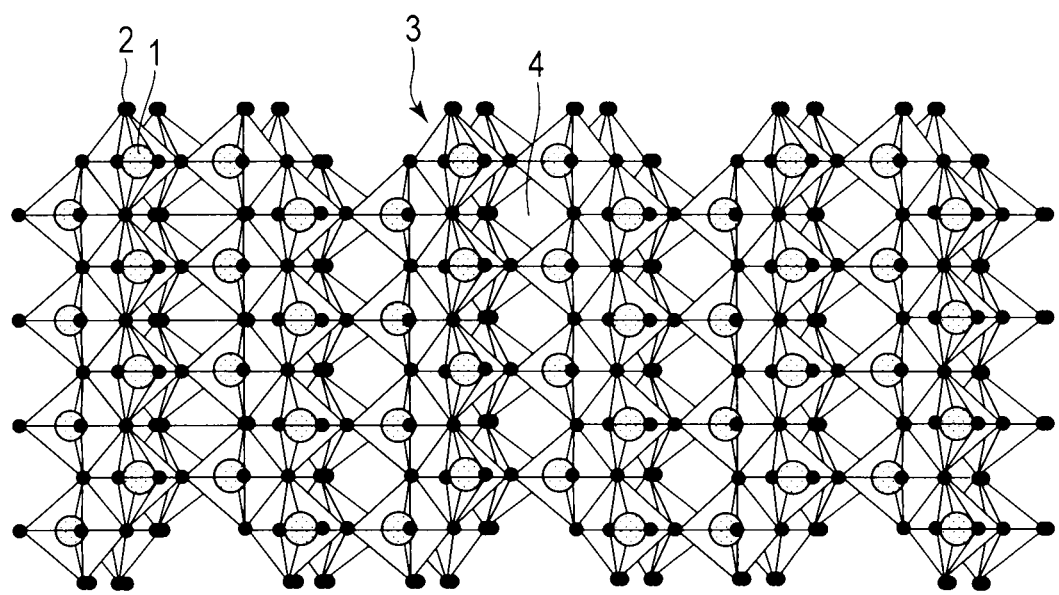
FIG. 1 is a typical view showing the crystal structure of monoclinic titanium dioxide.

FIG. 1 is a typical view showing the crystal structure of monoclinic titanium dioxide. Here, monoclinic titanium dioxide is referred to $TiO_2(B)$. Also, the titanium oxide compound having a crystal structure of monoclinic titanium dioxide is referred to as a titanium oxide compound having a $TiO_2(B)$ structure.

The crystal structure of $TiO_2(B)$ mainly belongs to the space group C2/m and has a tunnel structure as exemplified in FIG. 1, though there is the case where it belongs a different space group because a strain of a crystal structure is generated by the amount of intercalate and the type of heteroatom species. The details of the crystal structure of $TiO_2(B)$ are described in R. Marchand, L. Brohan, M. Tournoux, Material Research Bulletin 15, 1129 (1980).

As shown in FIG. 1, a titanium ion 1 and an oxide ion 2 constitute a skeleton structure portion 3. These skeleton structure portions 3 are combined with each other and form a continuous structure. A void portion 4 exists between the skeleton structure portions 3. This void portion 4 may serve as the host site for the intercalation (or insertion) of heteroatom species.

TiO$_2$(B) is said to have the existence of host sites capable of absorbing/releasing heteroatom species on the surface of the crystal. When lithium ions are inserted into and released from these host sites, TiO$_2$(B) can absorb and release lithium ions reversibly.

When lithium ions are inserted into the void portion 4, Ti$^{4+}$ constituting the skeleton is reduced to Ti$^{3+}$ to thereby maintain the electrical neutralization of a crystal. Because TiO$_2$(B) has one Ti$^{4+}$ per chemical formula, a maximum of one lithium ion can be theoretically inserted between layers. For this, a titanium oxide compound having a TiO$_2$(B) structure may be represented by the formula Li$_x$TiO$_2$ (0≤x≤1). This titanium oxide compound having a TiO$_2$(B) structure has a theoretical capacity about two times that of titanium oxide having a spinel structure or anatase structure. In this case, x in the above formula is varied within a range of 0 to 1 by a charge-discharge reaction.

It is therefore considered that the theoretical capacity of a battery can be raised by using a titanium oxide compound having a TiO$_2$(B) structure as the active material.

However, a titanium oxide compound having a TiO2(B) structure exhibits solid acidity and has a pH of 1 or more and less than 7. This is because TiO$_2$(B) has a highly reactive solid acid point (for example, a hydroxyl group (OH$^-$) and a hydroxyl group radical (OH.) on the surface and also acts as a solid catalyst. For this, when a titanium oxide compound having a TiO$_2$(B) structure is used as the active material, there is a problem concerning high reactivity with the nonaqueous electrolyte.

When titanium dioxide having an anatase structure or lithium titanate having a spinel structure is used, they react with the nonaqueous electrolyte to form a stable film and therefore, the decomposition reaction of the nonaqueous electrolyte on the surface of the active material is limited. However, since a titanium oxide compound having a TiO$_2$(B) structure has high catalytic activity, it reacts with the nonaqueous electrolyte also after the film is once formed. As a result, the cycle life of a battery is reduced by various factors such as reduction in electrode performance, rise in the internal resistance of a battery and deterioration of the nonaqueous electrolyte. Particularly, when a trace amount of water is present in a battery, the titanium oxide compound having a TiO$_2$(B) structure expresses a high in-water solid acidity. Water can be contaminated in a step of producing raw material and in a step of fabricating a battery and it is difficult to remove water chemically perfectly from the viewpoint of the nature of the raw material and the cost.

Also, unlike lithium titanate having a spinel structure, a titanium oxide compound having a TiO$_2$(B) structure largely varies in crystal lattice size during charge/discharge. The large change in crystal lattice size brings about a change in the volume of the electrode applied to the current collecting foil. This causes the electrode to be distorted and the active material to be peeled from the current collecting foil, with the result that there is a fear as to reduction in the cycle life of a battery.

In view of this situation, the inventors have limited the influence of the solid acid point (namely, a catalyst active point) of a titanium oxide compound having a TiO$_2$(B) structure by compounding a basic polymer in the electrode to thereby neutralize at least a part of the solid acid points, and succeeded in improving the cycle life of a nonaqueous electrolyte battery.

An electrode, a method of producing the electrode, a nonaqueous electrolyte battery using the electrode, a battery pack and an active material according to each embodiment will be explained with reference to the drawings. In this case, structures common to these embodiments are designated by the same symbols and duplicated explanations are omitted here.

First Embodiment

A battery electrode according to a first embodiment comprises a titanium oxide compound having a TiO$_2$(B) structure and a basic polymer. The titanium oxide compound having a TiO$_2$ structure may be represented by the formula LixTiO$_2$ (0≤x≤1).

When the titanium oxide compound having a TiO$_2$(B) structure and basic polymer are contained in the electrode, the basic polymer exists on at least a part of the surface of the titanium oxide compound. The solid acid point on the surface of the titanium oxide compound is neutralized, so that the catalyst is deactivated. As a result, reactivity between the titanium oxide compound and the nonaqueous electrolyte is reduced, which limits deterioration in electrode performance, rise in the internal resistance of the battery, and deterioration of the nonaqueous electrolyte. Accordingly, the use of the electrode containing the titanium oxide compound having a TiO$_2$(B) structure and basic polymer enables the battery to be improved in cycle life. Also, the deactivation of the solid acid point of the titanium oxide compound having a TiO$_2$(B) structure decreases the irreversible capacity of the battery and also improves charge/discharge efficiency.

The titanium oxide compound having a TiO$_2$(B) structure preferably has the form of secondary particle enabling the specific surface area to be limited, to stabilize the electrode slurry and to restrict side reactions based on the contact with the electrolytic solution though it may have either the form of primary particle or the form of secondary particle.

Examples of the state where the basic polymer exists on at least a part of the surfaces of the titanium oxide particle includes, for example, the case where the basic polymer is bonded and/or adhere to at least a part of the surfaces of either or both primary particle and secondary particle of the titanium oxide compound. Examples of the state also include the case where voids of the titanium oxide compound particle are impregnated with the basic polymer. The state of the basic polymer is, though not limited to, preferably the condition where the titanium oxide compound particle is coated with the basic polymer. In this case, the titanium oxide compound particle is preferably coated with the basic polymer to the extent that the conductivity is not decreased and the absorption/release of Li is not inhibited.

The existence of the basic polymer in the electrode can be confirmed by measuring the surface of the electrode by IR or Raman measurement. Also, the state where the titanium oxide compound is coated with the basic polymer can be confirmed by a transmission electron microscope (TEM) or scanning electron microscope (SEM).

It is unnecessary to neutralize all solid acid points of the titanium oxide compound, but it is only necessary to neutralize at least a part of the solid acid points.

The basic polymer may be either conductive or nonconductive.

The content of the basic polymer in the electrode is preferably 0.01 to 10 wt % based on the titanium oxide compound having a TiO$_2$(B) structure (excluding the weight of the basic polymer). When 0.01 wt % or more of the basic polymer is contained, the effect of neutralizing solid acid points can be obtained. When the content of the basic polymer is designed to be 10 wt % or less, the conductivity of the electrode can be prevented from being dropped.

The content of the basic polymer in the electrode may be measured by thermal decomposition a gas chromatography/mass spectrometry (GC/MS) using the double-shot method.

The basic polymer preferably has, though not limited to, a molecular weight of 100 to 100000. When the molecular weight is 100 or more, polymer strength and bonding ability which can stand to a variation in the lattice size of the active material in charge and discharge cycle can be obtained. When the molecular weight is 100000 or less, lithium ion conductivity and electron conductivity can be secured even if the surface of the active material is coated. The molecular weight is more preferably 500 to 5000.

An amine compound may be used as the basic polymer. As the amine compound, a nitrogen-containing aromatic heterocyclic compound is preferably used though the amine compound is not limited to the nitrogen-containing aromatic heterocyclic compound. A high coating effect can be obtained by using the nitrogen-containing aromatic heterocyclic compound. As the nitrogen-containing aromatic heterocyclic compound, one compound may be singly used or a combination of a plurality of compounds may be used.

Preferable examples of the nitrogen-containing aromatic heterocyclic compound include quinoline, isoquinoline, acridine, phenanthridine, phenanthroline, acetylpyridine, phenylpyridine, 2,6-di-t-butyl-4-methylpyridine, pyridazine, pyrimidine, pyrazine, cinnoline, phtharazine, quinazoline quinoxaline, methylpyridazine, acetylpyridazine, phenylpyridazine, methylpyrimidine, acetylpyrimidine, phenylpyrimidine, methylpyrazine, acetylpyrazine, phenylpyridine, triazine, benzotriazine, methyltriazine, acetyltriazine, phenyltriazine, tetrazine, methyltetrazine, acetyltetrazine, phenyltetrazine, pyrrole, methylpyrrole, vinylpyrrole, methylpyrrole, acetylpyrrole, phenylpyrrole, indole, methylindole, carbazole, methylcarbazole, oxazole, thiazole, isoxazole, benzoxazole, benzoisoxazole, anthranyl, benzothiazole, benzoisothiazole, imidazole, pyrazole, oxadiazole, thiadiazole, oxadiazole, N-methylimidazole, N-phenylimidazole, N-vinylimidazole, N-acetylimidazole, benzoimidazole, isoindazole, indazole and benzofurazane.

Imidazole salts such as polybenzimidazole have strong polymer strength and are therefore preferable. Also, pyridine type compounds such as polyvinylpyridine have a high solid acidity reducing effect and are therefore preferable.

In this embodiment, at least one type selected from cellulose ether compounds and copolymer rubbers may be contained in the electrode. The cellulose ether compound and the copolymer rubber may be contained as the binder in the electrode, though not limited to the binder. Also, the cellulose ether compound may be contained as a thickener of the binder.

These cellulose ether compounds and copolymer rubbers are known to have a tendency to coat particle. Therefore, when, in addition to the titanium oxide compound having a $TiO_2(B)$ structure and basic polymer, at least one type selected from cellulose ether compounds and copolymer rubbers is further contained in the electrode, synergetic effect with the basic polymer is obtained, whereby a higher coating effect can be obtained. As a result, the solid acidity of the titanium oxide compound can be more reduced and the reaction between the titanium oxide compound and the nonaqueous electrolyte can be more limited.

These cellulose ether compounds are so weak to acidity that it is decomposed by a solid acid and it is therefore difficult to use these cellulose ether compounds as a material for coating the titanium oxide compound having a $TiO_2(B)$ structure. However, according to this embodiment, the solid acidity of the titanium oxide compound is neutralized by the basic polymer and it is therefore possible to contain the cellulose ether compound together with the titanium oxide compound.

The cellulose ether compound and copolymer rubber may preferably be both contained in the electrode though they may be used singly. The copolymer rubber has a low viscosity and exists in a dispersed state in a solvent. However, the viscosity can be increased by adding the cellulose ether compound together with the copolymer rubber, thereby can be improved the effect of coating the titanium oxide compound. As a result, a higher solid acidity reducing effect can be obtained.

Moreover, because the cellulose ether compound and copolymer rubber also act as binders, the bonding ability of the electrode can be improved. As mentioned above, the cellulose ether compound and copolymer rubber have the nature of coating particle. Therefore, these cellulose ether compound and copolymer rubber coat the particles of active material and conductive agent in the electrode to thereby enable the particle to be bonded among them through facial contact. As a result, the viscoelasticity of the electrode can be improved. The improvement in viscoelasticity can improve resistance to variation in the volume of the electrode, thereby limiting the distortion of the electrode and the peeling of the active material layer from the current collecting foil.

When at least one type selected from cellulose ether compounds and copolymer rubbers is contained in the electrode, the reaction between the electrode and the electrolyte is limited and also, the peeling of the electrode is limited, thereby ensuring that the cycle life of the battery can be more improved.

Preferable examples of the cellulose ether compound include carboxymethyl cellulose, carboxyethyl cellulose and hydroxyethyl cellulose, alkali metal salts of these cellulose compounds such as lithium salts, sodium salts, and potassium salts and ammonium salts of these cellulose compounds.

Preferable examples of the copolymer rubber include styrene/conjugate diene copolymers such as a styrene/butadiene copolymer rubber; nitrile/conjugate diene copolymers such as a nitrile/butadiene copolymer rubbers; silicon rubber such as a polyorganosiloxane; polymers of alkyl acrylates; acryl rubbers obtained by copolymerization of alkyl acrylates with ethylenic unsaturated carboxylic acids or other ethylenic unsaturated monomers; and fluoro rubbers such as vinylidene fluoride copolymer rubbers.

In this embodiment, no particular limitation is imposed on the particle diameter and BET specific surface area of the titanium oxide compound. The same effect is obtained by titanium oxide compounds having any particle diameter and specific surface area.

The cellulose ether compound is preferably contained in a ratio of 0.5 to 5 wt % based on the titanium oxide compound having a $TiO_2(B)$ structure (excluding the weight of the basic polymer). When 0.5 wt % or more of the cellulose ether compound is contained, the slurry can be stably thickened while coating the surface of particle. When the cellulose ether compound is contained in a ratio of 5 wt % or less on the other hand, the reduction in electron conductivity and ion conductivity caused by an excess amount of the cellulose ether compound to be coated can be prevented.

The copolymer rubber is preferably contained in a ratio of 0.5 to 10 wt % based on the titanium oxide compound having a $TiO_2(B)$ structure (excluding the weight of the basic polymer). When 0.5 wt % or more of the copolymer rubber is contained, bonding ability with the current collector can be secured, ensuring that excellent cycle characteristics can be obtained.

When the copolymer rubber is contained in a content of 10 wt % or less, the fluidity of the electrode slurry can be secured and coatability (productivity) can be improved while keeping electron conductivity and ion conductivity.

The existence of the cellulose ether compound and the existence of the copolymer rubber in the electrode can be confirmed by observing the surface of the electrode by a scanning electron microscope or transmission electron microscope.

The content of the cellulose ether compound and the content of the copolymer rubber in the electrode may be measured by thermal decomposition GC/MS using the double-shot method.

The thermal decomposition GC/MS using the double-shot method, which is used to measure the content of the basic polymer, cellulose ether compound and copolymer rubber in the electrode, may be performed, for example, as in the following.

In the case of using an electrode which is already incorporated into a battery to measure these contents, first, the battery is put into a discharge state (namely, the state that lithium ions are extracted from titanium oxide compounds) to release lithium ions from the negative electrode. Next, the battery is disassembled carefully so as not to develop short circuits and the extracted electrode is properly cut. The cut electrode is washed in a solvent such as ethyl methyl carbonate to remove salts in the electrolytic solution. Next, the electrode is placed in an ultrasonic cleaner with dipping the electrode in a solvent such as ethyl methyl carbonate, thereby enabling the separation of the electrode active material from the current collector. The evaporation to dryness makes it possible to obtain a mixture of the electrode active material, binder and conductive agent adjuvant. It is required to carry out this step when measuring an electrode before it is incorporated into a battery.

Next, the obtained sample is subjected to GC/MS using the double-shot method. The double-shot method is a method in which the analysis of a low molecular weight component is performed with first mild temperature rise and the analysis of a polymer component is performed with second instant heat decomposition. By this method, the existences of the basic polymer having a low molecular weight and an amine group can be found and cellulose and rubber components can be separated and examined.

According to the above embodiment, an electrode used to attain a battery improved in cycle life and charge/discharge efficiency can be provided.

Second Embodiment

A method of producing an electrode according to the above first embodiment will be explained in detail.

The method of producing an electrode comprises reacting an alkali titanate compound with an acid to exchange an alkali cation for a proton, thereby forming a protonic titanate compound (namely, a proton-exchanged compound), heating the protonic titanate compound to produce titanium oxide compound particle having a monoclinic titanium dioxide crystal structure, and making a basic polymer exist on the surface of the titanium oxide compound particle.

First, the alkali titanate compound is reacted with an acid to replace the alkali cation with a proton to thereby obtain a proton-exchanged compound.

Alkali titanate compounds such as sodium titanate, potassium titanate or cesium titanate may be used, though not limited to these compounds. Examples of alkali titanate compounds include $Na_2Ti_3O_7$, $K_2Ti_4O_9$ and $Cs_2Ti_5O_{12}$. These alkali titanate compounds may be obtained by the solid phase reaction method in which a raw material oxide, a carbonate and the like are mixed in a predetermined stoichiometric ratio and heated. There is no particular limitation to the crystal form of the alkali titanate compound. Also, the alkali titanate compound is not limited to those synthesized by the above method and may be commercially available ones.

The alkali titanate compound is sufficiently washed with distilled water to remove impurities. Then, an acid is reacted with the alkali titanate compound to replace the alkali cation of the alkali titanate compound with a proton, to thereby obtain a proton-exchanged compound. When alkali titanate compounds such as sodium titanate, potassium titanate or cesium titanate are treated by an acid, the alkali cation can be replaced with a proton without destroying the crystal structure. For proton exchange, an acid such as hydrochloric acid, nitric acid or sulfuric acid having a concentration of 0.5 to 2 mol/L may be used.

The acid treatment may be carried out by adding an acid to a powder of the alkali titanate compound with stirring. The acid treatment is preferably continued until the alkali cation is replaced sufficiently with a proton. If alkali cations such as potassium, cesium and sodium are left unremoved in the proton-exchanged compound, they are a cause of reduced charge/discharge capacity. Therefore, it is preferably to replace almost all alkali cations with protons.

Although no particular limitation is imposed on the time of acid treatment, the acid treatment is preferably carried out for 24 hours or more when it is carried out at about ambient temperature (25° C.) by using hydrochloric acid having a concentration of about 1M. The acid treatment is more preferably carried out for about one to two weeks. Moreover, it is preferable to exchange the acid solution for a new one every 24 hours. In order to perform proton exchange more efficiently, the acid treatment is preferably carried out while milling the alkali titanate compound by a ball mill or the like.

After the proton exchange is finished, an alkaline solution such as an aqueous lithium hydroxide solution is optionally added to neutralize the residual acid. The obtained proton-exchanged compound is washed with distilled water and then dried. The proton-exchanged compound is sufficiently washed with water until the pH of washed water falls in the range of 6 to 8. In the meantime, the process may progress to the next stage without neutralizing the residual acid treatment, washing and drying after the acid.

Then, the proton-exchanged compound is heat-treated to obtain a titanium oxide compound having a structure represented by the formula $TiO_2$. Although Li may be contained in advance in the titanium oxide compound, the titanium oxide compound may be absorbed with Li by charge/discharge.

Heat treatment is preferably carried out by burning. The burning temperature is preferably in a range of 300 to 500° C. though it is properly determined depending on the proton-exchanged compound because the optimum burning temperature differs depending on the conditions such as composition, particle diameter and crystal form of the proton-exchanged compound. When the burning temperature is 300° C. or more, good crystallinity is obtained and also, high electrode capacity, charge/discharge efficiency and cycle performance are obtained. When the burning temperature is 500° C. or less on the other hand, the production of an impurity phase is limited and therefore deterioration in electrode performance can be prevented. The burning temperature is more preferably 350 to 400° C. because the obtained titanium oxide compound has a higher capacity. Heating time may be, though not limited to, in a range of 2 to 3 hours.

Whether the obtained titanium oxide compound has a $TiO_2$ (B) crystal structure or not may be determined by measurement with powder X-ray analysis using a Cu-Kα as a ray source.

The powder X-ray diffraction measurement may be performed in the following manner. First, an object sample is milled until the average particle diameter is about 5 μm. The average particle diameter can be found by the laser diffraction method. The milled sample is filled in a 0.2-mm-deep holder part which is formed on a glass sample plate. At this time, it is necessary to take care to fill the holder part fully with the sample. Also, special care should be taken to avoid cracking, formation of voids, and the like caused by insufficient filling of the sample. Then, a separate glass plate from outside is used to smooth the surface of the sample by sufficiently pressing the separate glass plate against the sample. Much care should be taken to avoid shortage and overage (cracks and voids) in the amount of the sample to be filled, thereby preventing any rise and dent from the basic plane of the glass holder. Then, the glass plate filled with the sample is mounted on the powder X-ray diffractometer to obtain a diffraction pattern by using Cu-Kα rays.

In the case where a sample has high orientation, for example, in the case where the specific peak intensity ratio is shifted by about 50% or more from the standard peak intensity ratio described in the JCPDS card which is the standard mineral data base in a powder X-ray diffraction pattern, there is the possibility that the position of the peak is shifted and intensity ratio is varied by the state of filling of the sample. It is necessary to measure a sample like this by pouring a solution with the sample dissolved therein into the glass holder and by spraying the solution using a spray to arrange the particle at random.

Alternatively, an object sample may be made into a pellet form to measure. The pellet is formed after the object sample is sufficiently ground in advance. The pellet may be a compressed powder body having, for example, a diameter of 10 mm and a thickness of 2 mm. The compressed powder body may be produced by applying a pressure of about 250 MPa to the sample for 15 minutes. The obtained pellet is placed in an X-ray diffractometer to measure the surface of the sample. A difference in the result of measurement among operators can be eliminated to thereby improve reproducibility by measuring using such a method.

Next, the basic polymer is made to exist on the surface of the obtained titanium oxide compound particle having a $TiO_2$(B) structure. As a first method, a method will be explained in which the synthesized titanium oxide compound having a $TiO_2$(B) structure is treated in advance by the basic polymer and the treated titanium oxide compound is used to produce an electrode. Also, as a second method, a method will be explained in which the synthesized titanium oxide compound having a $TiO_2$(B) structure and the basic polymer are separately used to produce an electrode.

<First Method>

In the first method, the obtained titanium oxide compound having a $TiO_2$(B) structure is treated in advance by the basic polymer and the treated titanium compound is used to produce an electrode.

This method comprises preparing a dispersion solution by dispersing the titanium oxide compound particle in a solution of the basic polymer, thereby forming a titanium oxide compound particle coated with the basic polymer, separating the titanium oxide compound particle coated with the basic polymer from the dispersion solution, and preparing an electrode-forming slurry by dispersing the titanium oxide compound particle coated with the basic polymer in a solvent.

Figure 2:
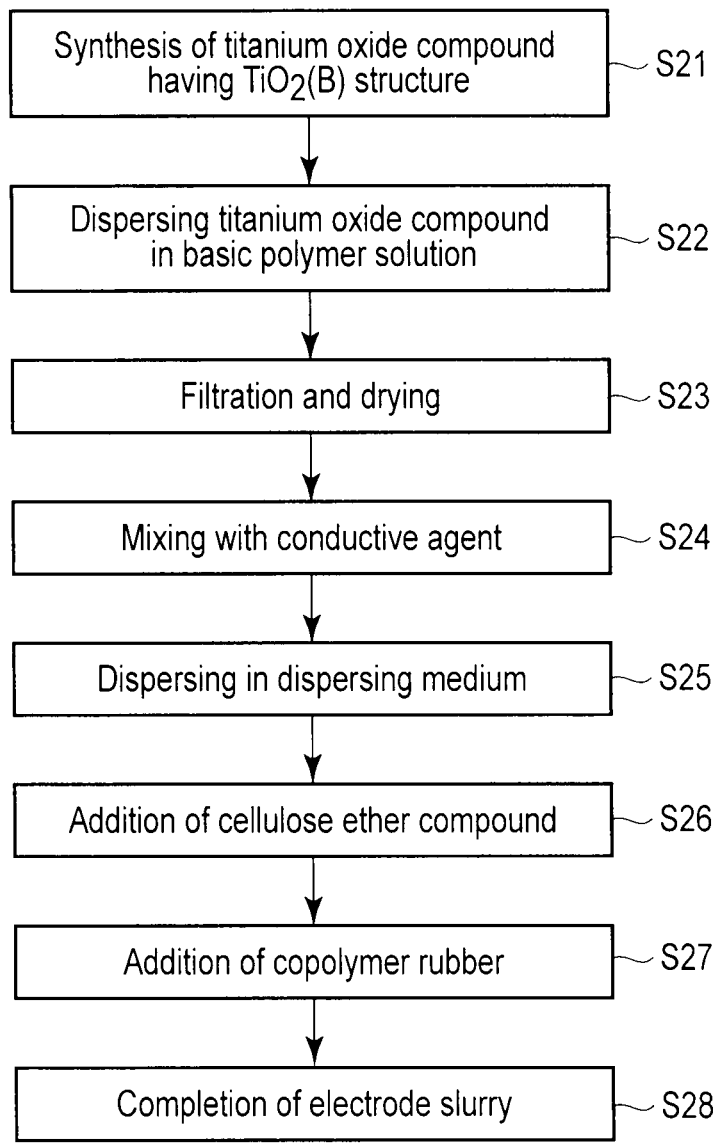
FIG. 2 is a flowchart of a method of producing an electrode in a first method of a second embodiment.

An example of the flowchart of the first method is shown in FIG. 2. In the example of FIG. 2, a powder of the synthesized titanium oxide compound (S21) is dispersed in the basic polymer solution to prepare a dispersion solution (S22). At this time, the pressure of the dispersion solution may be reduced to promote the penetration of the basic polymer solution into voids of the titanium oxide compound.

Then, the dispersion solution is subjected to filtration to separate the titanium oxide compound coated with the basic polymer and the separated titanium oxide compound is dried (S23). The drying may be carried out by heating. The heating temperature is controlled depending on the type of basic polymer. The heating temperature preferably in a range of 60 to 200° C. and may be set to, for example, about 130° C.

In this case, the content of the basic polymer in the titanium oxide compound coated with the basic polymer is preferably 0.01 to 10 wt % based on the titanium oxide compound having a $TiO_2$(B) structure (excluding the weight of the basic polymer). When 0.01 wt % or more of the basic polymer is contained, the effect of neutralizing solid acid points can be obtained. A large part of the basic polymer existing in the electrode can be made to exist on the surface of the titanium oxide compound by coating it with the basic polymer in advance, and therefore, the content of the basic polymer can be reduced to 10 wt % or less. The content of the basic polymer can be changed by controlling the concentration of the basic polymer solution to be used for preparing the dispersion solution. Alternatively, the content of the basic polymer can be changed by changing the method of separating the titanium oxide compound from the dispersion solution to regulate the amount of the basic polymer solution adhere to the titanium oxide compound.

Then, the titanium oxide compound coated with the basic polymer is mixed with a conductive agent (S24). This mixture is added to a dispersion solvent for preparing slurry to prepare a dispersion solution (S25). A cellulose ether compound is added to this dispersion solution to mix (S26). A copolymer rubber is further added the solution to mix (S27), thereby an electrode-forming slurry is obtained (S28).

The slurry obtained in this manner may be applied to one or both of surfaces of a metal foil which functions as a current collector, followed by drying and pressing to thereby obtain an electrode.

Figure 3:
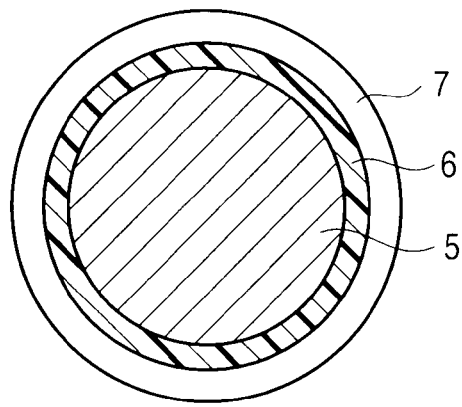
FIG. 3 is a typical sectional view showing particle in an electrode produced according to the flowchart shown in FIG. 2.

FIG. 3 shows a typical sectional view of titanium oxide compound particle in the electrode produced by the first method. As shown in FIG. 3, secondary particle 5 of the titanium oxide compound are coated with the basic polymer layer 6 and also, the basic polymer layer 6 is coated with a mixed layer 7 of a binder (namely, a cellulose ether compound and a copolymer rubber) and the conductive agent.

Though both the cellulose ether compound and the copolymer rubber are contained in the example of FIG. 2, any one of these compounds may be contained or other binder may be contained without using any of the both.

<Second Method>

In the second method, the obtained titanium oxide compound having a $TiO_2$ structure and the basic polymer are separately used to produce an electrode.

The second method comprises preparing a dispersion solution by dispersing the titanium oxide compound particle in a solution of the basic polymer, and preparing an electrode-forming slurry by using the dispersion solution.

Figure 4:
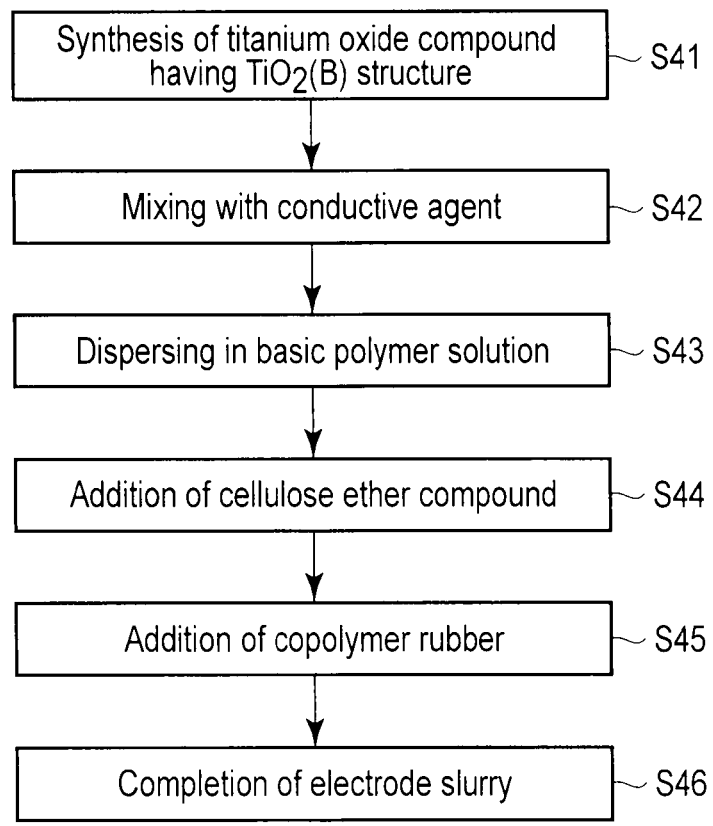
FIG. 4 is a flowchart of a method of producing an electrode in a second method of a second embodiment.

An example of the flow of the second method is shown in FIG. 4. In the example of FIG. 4, the synthesized titanium oxide compound powder (S41) is mixed with a conductive agent (S42). Next, this mixture is dispersed in the basic polymer solution to prepare a dispersion solution (S43). At this time, the pressure of the dispersion solution may be reduced to promote the penetration of the basic polymer solution into voids of the titanium oxide compound.

Then, a cellulose ether compound is added in this dispersion solution and mixed (S44). Further, a copolymer rubber is added to and mixed (S45) in the dispersion solution to thereby obtain an electrode-forming slurry (S46).

The slurry obtained in this manner may be applied to one or both of surfaces of a metal foil which functions as a current collector, followed by drying and pressing to obtain an electrode.

Figure 5:
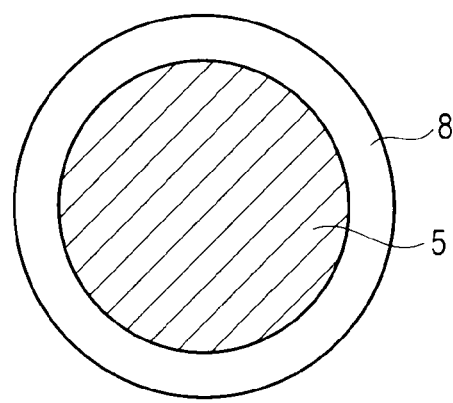
FIG. 5 is a typical sectional view showing particle in an electrode produced according to the flowchart shown in FIG. 4.

FIG. 5 shows a typical sectional view of titanium oxide compound particle in the electrode produced by the second method. As shown in FIG. 5, secondary particle 5 of the titanium oxide compound is coated with a mixed layer 8 of the binder (namely, the cellulose ether compound and copolymer rubber), conductive agent and basic polymer.

Although, in an example of FIG. 4, both the cellulose ether compound and the copolymer rubber are contained, only one of them may be contained, or other binder may be contained without using any of the both.

Also, in the second method, the content of the basic polymer is preferably 0.05 wt % or more based on the titanium oxide compound having a $TiO_2(B)$ structure (excluding the weight of the basic polymer) to obtain the effect of neutralizing the solid acid points of the titanium oxide compound having a $TiO_2(B)$ structure. The content of the basic polymer can be changed by controlling the concentration of the basic polymer solution and/or the mixing ratio of the basic polymer to the titanium oxide compound having a $TiO_2(B)$ structure.

In the electrode produced by the above production method, the basic polymer exists on at least a part of the titanium oxide compound having a $TiO_2(B)$ structure and at least a part of the solid acid points of the titanium oxide compound is neutralized. This enables the production of an electrode limited in the reactivity between the titanium oxide compound and the nonaqueous electrolyte.

Further, in this embodiment, a cellulose ether compound and/or a copolymer rubber may be used as a binder. These cellulose ether compound and copolymer rubber are dispersed in water and therefore, water may be used in place of an organic solvent as the solvent of the electrode-forming slurry. There is therefore such an advantage that the cost and environmental load can be reduced, and also, the equipment can be simplified.

According to the above embodiment, a method of producing an electrode can be provided, the electrode ensuring a battery improved in cycle life and charge/discharge efficiency.

Third Embodiment

According to a third embodiment, there is provided a nonaqueous electrolyte battery comprising the electrode according to the first embodiment as the negative electrode, and further, a positive electrode capable of absorbing and releasing lithium, a nonaqueous electrolyte, a separator and a container.

The negative electrode, positive electrode, nonaqueous electrolyte, separator and container will be explained in detail.

1) Negative Electrode

As the negative electrode, an electrode comprising the titanium oxide compound having a $TiO_2(B)$ structure and the basic polymer may be used, as explained in the above first embodiment. Specifically, the negative electrode comprises a current collector and a negative electrode layer (i.e. a negative electrode active material-containing layer). The negative electrode layer is formed on one or both of surfaces of the current collector and comprises an active material and, according to the need, a conductive agent and a binder.

The negative electrode explained in the first embodiment has low reactivity with the nonaqueous electrolyte because the solid acid points of the titanium oxide compound are deactivated. Therefore, a nonaqueous electrolyte battery using such a negative electrode is limited in the deterioration of performance and therefore has a good cycle life.

It is preferable that the negative electrode further comprises at least one of a cellulose ether compound and a copolymer rubber. It is more preferable that the negative electrode contains both the cellulose ether compound and copolymer rubber. When the negative electrode contains the both, the effect of coating the surface of particle is improved and adhesion among active material particle and between the current collecting foil and the active material particle can be improved. This restrains the distortion and peeling of the electrode which are caused by a variation in the lattice volume of titanium oxide compound during charge/discharge, thereby improving the cycle life of the battery.

As the active material, other active materials may be used together with the titanium oxide compound having a $TiO_2(B)$ structure. Examples of the other active materials include nanotube/nano-fiber type titanium dioxide:$TiO_2$, lithium titanate having a rhamsdelite structure:$Li_2Ti_3O_7$, and lithium titanate having a spinel structure:$Li_4Ti_5O_{12}$. These titanium oxide compounds are suitably used because the titanium oxide compounds each have, for example, a specific gravity close to that of the titanium oxide compound having a $TiO_2$(B) structure, and are therefore easily mixed and dispersed.

The conductive agent improves the current collecting performance of the active material and therefore, restrains the contact resistance with the current collector. Examples of the conductive agent include carbonaceous materials such as acetylene black, carbon black and graphite.

The binder is formulated to fill the voids between the dispersed negative electrode active materials and binds the active material with the conductive agent. Examples of the binder include polytetrafluoroethylene (PTFE) and polyvinylidene fluoride (PVdF). In the case of using these binders, the effect of restraining solid acidity by the basic polymer can also be obtained. However, when the cellulose ether compound or copolymer rubber is contained in the negative electrode, these materials function as binders and it is therefore unnecessary to use other binders.

In the negative electrode layer, the contents of the active material, basic polymer, conductive agent and binder are preferably 68 parts by weight to 96 parts by weight, 0.01 parts by weight to 5 parts by weight, 2 parts by weight to 30 parts by weight and 2 parts by weight to 20 parts by weight, respectively.

When the content of the basic polymer is 0.01 parts by weight or more, the effect of limiting solid acidity can be obtained. When the content of the conductive agent is 2 parts by weight or more, the current collecting performance of the negative electrode layer is good. When the content of the binder is 2 parts by weight or more, the bonding ability between the negative electrode layer and the current collector is sufficient and therefore, excellent cycle characteristics can be expected. On the other hand, the content of the basic polymer is preferably 5 parts by weight or less to secure the electron conductivity and the ion conductivity. Also, it is preferable that the conductive agent is 10 parts by weight or less and the binder is 10 parts by weight or less to increase a capacity of a nonaqueous electrolyte battery.

As the current collector, materials which are electrochemically stable at the lithium absorption/release potential of the negative electrode active material are used. The current collector is preferably made from copper, nickel, stainless or aluminum, or an aluminum alloy containing one or more elements selected from Mg, Ti, Zn, Mn, Fe, Cu and Si. The thickness of the current collector is preferably 5 to 20 μm. The current collector having such a thickness can keep a balance between the strength and the reduction in the weight of the negative electrode.

The negative electrode may be produced as explained in the second embodiment above. The prepared electrode slurry is applied to a current collector and dried to form a negative electrode layer, followed by pressing to produce the electrode. Alternatively, the negative electrode may be produced in the following manner: the active material, basic polymer, conductive agent and binder are made into a pellet form to produce a negative electrode layer, which is then placed on a current collector.

2) Positive Electrode

The positive electrode comprises a current collector and a positive electrode layer (i.e. a positive electrode active material-containing layer). The positive electrode layer is formed on one or both of surfaces of the current collector and comprises an active material and according to the need, a conductive agent and a binder.

As the positive electrode active material, for example, oxides, sulfides or polymers may be used. Examples of the oxides and sulfides include those having the capability of absorbing lithium, such as manganese dioxide ($MnO_2$), iron oxide, copper oxide, nickel oxide, lithium-manganese complex oxide (for example, $Li_xMn_2O_4$ or $Li_xMnO_2$), lithium-nickel complex oxide (for example, $Li_xNiO_2$), lithium-cobalt complex oxide (for example, $Li_xCoO_2$), lithium-nickel-cobalt complex oxide (for example, $LiNi_{1-y}Co_yO_2$), lithium-manganese-cobalt complex oxide (for example, $Li_xMn_y$ $Co_{1-y}O_2$), lithium-manganese-nickel complex oxide having a spinel structure (for example, $Li_xMn_{2-y}Ni_yO_4$), lithium phosphate having an olivine structure (for example, $Li_xFePO_4$, $Li_xFe_{1-y}Mn_yPO_4$, $Li_xCoPO_4$), iron sulfate [$Fe_2(SO_4)_3$], vanadium oxide (for example, $V_2O_5$) and lithium-nickel-cobalt-manganese complex oxide. Here, $0<x\leq1$ and $0<y\leq1$. As the active material, these compounds may be used either independently or in combinations.

Examples of the polymer include conductive polymer materials such as a polyaniline or polypyrrole or disulfide type polymer materials.

Also, sulfur (S) or fluorocarbon may also be used as the active material.

More preferable examples of the active material include those having a high positive electrode voltage such as lithium-manganese complex oxide ($Li_xMn_2O_4$), lithium-nickel complex oxide ($Li_xNiO_2$), lithium-cobalt complex oxide ($Li_xCoO_2$), lithium-nickel-cobalt complex oxide ($LiNi_{1-y}Co_yO_2$), lithium-manganese-nickel complex oxide having a spinel structure ($Li_xMn_{2-y}Ni_yO_4$), lithium-manganese-cobalt complex oxide ($Li_xMn_yCo_{1-y}O_2$), lithium iron phosphate ($Li_xFePO_4$) and lithium-nickel-cobalt-manganese complex oxide. Here, $0<x\leq1$ and $0<y\leq1$.

When an ambient temperature molten salt is used as the nonaqueous electrolyte of the battery, preferable examples of the active material include lithium iron phosphate, $Li_xVPO_4F$ ($0\leq x\leq1$), lithium-manganese complex oxide, lithium-nickel complex oxide and lithium-nickel-cobalt complex oxide. These compounds each have less reactivity with an ambient temperature molten salt and can therefore improve cycle life.

The specific surface area of the active material is preferably 0.1 $m^2$/g to 10 $m^2$/g. A positive electrode active material having a specific surface area of 0.1 $m^2$/g or more sufficiently secures lithium ion absorbing/release sites. A positive electrode active material having a specific surface area of 10 $m^2$/g or less is easily handled in industrial production processes, and can secure good charge and discharge cycle performance.

The binder binds the active material with the current collector. Examples of the binder include a polytetrafluoroethylene (PTFE), polyvinylidene fluoride (PVdF) and fluoro-rubber.

The conductive agent is formulated according to the need to improve the current collecting ability and also to reduce the contact resistance between the active material and the current collector. Examples of the conductive agent include carbonaceous materials such as acetylene black, carbon black, and graphite.

In the positive electrode layer, the active material and the binder are preferably formulated in ratios of 80 to 98% by mass and 2 to 20% by mass, respectively.

When the amount of the binder is 2% by mass or more, sufficient electrode strength is obtained. When the amount of the binder is 20% by mass or less, the amount of an insulting material to be formulated in the electrode can be reduced. As a result, the internal resistance can be reduced.

In the case of adding the conductive agent, the active material, binder and conductive agent are preferably formulated in ratios of 77 to 95% by mass, 2 to 20% by mass and 3 to 15% by mass, respectively. The conductive agent can develop the aforementioned effects when formulated in a ratio of 3% by mass or more. Also, when the ratio of the conductive agent is 15% by mass or less, the decomposition of the nonaqueous electrolyte on the surface of the positive electrode conductive agent when the battery is stored at high temperatures can be reduced.

The current collector is preferably made of an aluminum foil or aluminum alloy foil containing at least one element selected from Mg, Ti, Zn, Ni, Cr, Mn, Fe, Cu and Si.

The thickness of the aluminum foil or aluminum alloy foil is preferably 5 to 20 μm and more preferably 15 μm or less. The purity of the aluminum foil is preferably 99% by mass or more. The content of transition metals such as iron, copper, nickel and chromium, which are contained in the aluminum foil or aluminum alloy foil, is preferably 1% by mass or less.

The positive electrode is produced by suspending, for example, the active material, binder, and conductive agent which is to be formulated according to the need, in a proper solvent to prepare a slurry, by applying this slurry to the positive electrode current collector, by drying the slurry to form a positive electrode layer, and then by pressing the resultant positive electrode layer. The positive electrode may also be produced in the following manner: the active material, binder, and conductive agent which is to be formulated according to the need, are made into a pellet form to produce a positive electrode layer, which is then placed on a current collector.

3) Nonaqueous Electrolyte

The nonaqueous electrolyte may be, for example, a liquid nonaqueous electrolyte prepared by dissolving an electrolyte in an organic solvent or a gel-like nonaqueous electrolyte prepared by making a complex of a liquid nonaqueous electrolyte and a polymer material.

For preparing the liquid nonaqueous electrolyte, the electrolyte is preferably dissolved in an organic solvent in a concentration of 0.5 to 2.5 mol/L.

Examples of the electrolyte include lithium salts such as lithium perchlorate ($LiClO_4$), lithium hexafluorophosphate ($LiPF_6$), lithium tetrafluoroborate ($LiBF_4$), hexafluoro arsenic lithium ($LiAsF_6$), lithium trifluoromethasulfonate ($LiCF_3SO_3$), and bistrifluoromethylsulfonylimide lithium

[LiN(CF$_3$SO$_2$)$_2$]], or mixtures of these compounds. The electrolyte is preferably one which is scarcely oxidized even at a high potential and LiPF$_6$ is the most preferable.

Examples of the organic solvent include propylene carbonate (PC), ethylene carbonate (EC) and cyclic carbonates such as vinylene carbonate; chain carbonates such as diethyl carbonate (DEC), dimethyl carbonate (DMC) and methyl ethyl carbonate (MEC); cyclic ethers such as tetrahydrofuran (THF), 2-methyltetrahydrofuran (2MeTHF) and dioxolan (DOX); chain ethers such as dimethoxyethane (DME) and diethoxyethane (DEE); γ-butyrolactone (GBL), acetonitrile (AN) and sulfolan (SL). These organic solvents may be used either singly or in combinations.

Examples of the polymer material include a polyvinylidene fluoride (PVdF), polyacrylonitrile (PAN) and polyethylene oxide (PEO).

An ambient temperature molten salt containing lithium ion (ionic molten body), polymer solid electrolyte, inorganic solid electrolyte and the like may be used as the nonaqueous electrolyte.

The ambient temperature molten salt (ionic molten body) means a compound which exists in a liquid state at normal temperature (15-25° C.) among organic salts constituted of combinations of organic cations and anions. Examples of the ambient temperature molten salts include those which singly exist in a liquid state, those which are put into a liquid state by mixing with an electrolyte and those which are put into a liquid state by dissolving in an organic solvent. Generally, the melting point of the ambient temperature molten salt used for nonaqueous electrolyte batteries is 25° C. or less. Also, the organic cation generally has a quaternary ammonium skeleton.

The polymer solid electrolyte is prepared by dissolving an electrolyte in a polymer material, and then solidifying the resultant.

The inorganic solid electrolyte is a solid material having lithium ion conductivity.

4) Separator

The separator may be formed of, for example, porous films containing, a polyethylene, polypropylene, cellulose or polyvinylidene fluoride (PVdF) or nonwoven fabrics made of synthetic resins. Among these materials, porous films formed of a polyethylene or polypropylene can melt at a fixed temperature to cut off current, and therefore improve the safety.

5) Container

A container made of a laminate film with a thickness of 0.5 mm or less or a metal container with a thickness of 1 mm or less may be used. The thickness of the laminate film is more preferably 0.2 mm or less. The thickness of the metal container is more preferably 0.5 mm or less and even more preferably 0.2 mm or less.

Examples of the shape of the container include a flat type (thin type), angular type, cylinder type, coin type, button type and the like. Examples of the container include containers for miniature batteries to be mounted in, for example, mobile electronic devices and the like, or containers for large batteries to be mounted on two- to four-wheel automobiles and the like.

As the laminate film, a multilayer film prepared by interposing a metal layer between resin layers may be used. The metal layer is preferably formed of an aluminum foil or aluminum alloy foil to reduce the weight of the battery. The resin layer may be made of polymer materials such as a polypropylene (PP), polyethylene (PE), nylon and polyethylene terephthalate (PET). The laminate film can be molded into a desired shape by sealing through thermal fusion.

The metal container is made of aluminum, an aluminum alloy or the like. The aluminum alloy preferably contains elements such as magnesium, zinc, or silicon. When the alloy contains transition metals such as iron, copper, nickel and chromium, the content of the transition metals is preferably 1% by mass or less. This outstandingly improves long-term reliability and radiation ability under a high-temperature environment.

Figure 6:
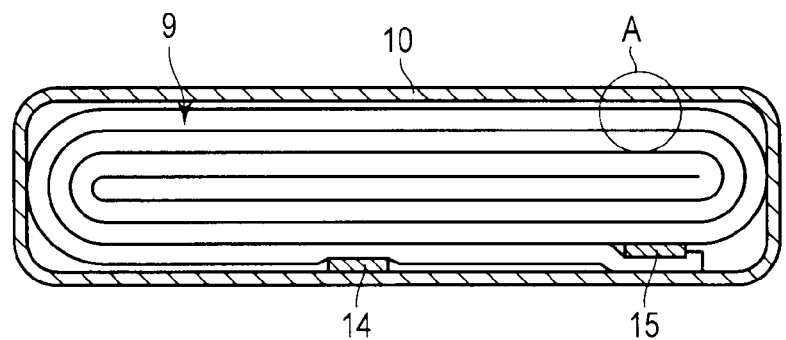
FIG. 6 is a sectional view of a flat type nonaqueous electrolyte battery of a third embodiment.
Figure 7:
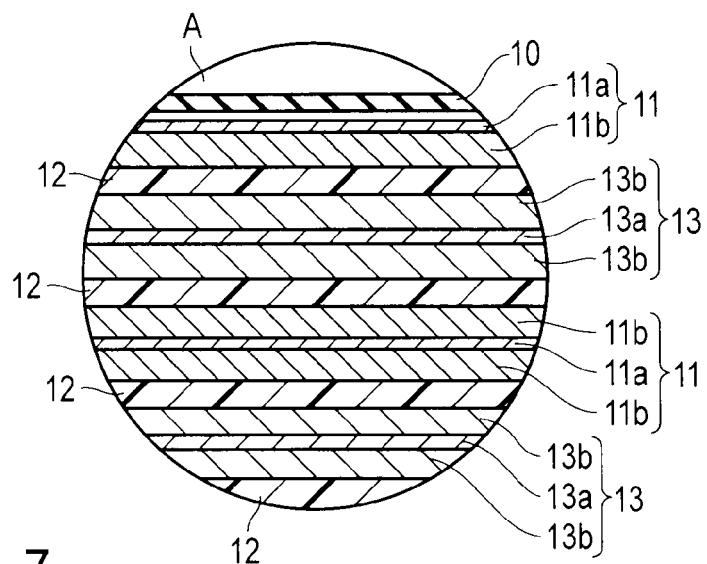
FIG. 7 is an enlarged sectional view of the part A of FIG. 6.

Next, a nonaqueous electrolyte battery according to a third embodiment will be explained in more detail with reference to the drawings. FIG. 6 is a sectional view of a flat type nonaqueous electrolyte battery and FIG. 7 is an enlarged sectional view of the part A of FIG. 6. In this case, each of these drawings is a typical view for explanations and promotion of the understanding of the embodiment. Though there are parts different from an actual battery in shape, dimension, ratio and the like, these structural designs may be properly changed taking the following explanations and known technologies into consideration.

A coil electrode group 9 having a flat form is accommodated in a baggy container 10 made of a laminate film obtained by interposing a metal layer between two resin layers. The coil electrode groups 9 having a flat form are formed, as shown in FIG. 7, by spirally coiling a laminate obtained by laminating a negative electrode 11, a first separator 12, a positive electrode 13 and a second separator 12 in this order from the outside and by press-molding the coiled laminate.

The negative electrode 11 comprises a negative electrode current collector 11a and a negative electrode layer 11b. The negative electrode layer 11b contains a negative electrode active material according to the first embodiment. The outermost negative electrode 11 has a structure in which as shown in FIG. 6, a negative electrode layer 11b is formed on one of the inside surfaces of the negative electrode current collector 11a. Other negative electrodes 11 each have a structure in which a negative electrode layer 11b is formed on both surfaces of the current collector 11a. In the positive electrode 13, a positive electrode layer 13b is formed on both surfaces of a positive electrode current collector 13a.

As shown in FIG. 6, in the vicinity of the outer peripheral end of the coil electrode group 9, a negative electrode terminal 14 is connected to the negative electrode current collector 11a of the outermost negative electrode 11 and a positive electrode terminal 15 is connected to the positive electrode current collector 13a of the inside positive electrode 13. These negative electrode terminal 14 and positive electrode terminal 15 are externally extended from an opening part of the baggy container 10. A liquid nonaqueous electrolyte is, for example, injected from the opening part of the baggy container 10. The opening part of the baggy container 10 is closed by heat sealing with the negative electrode terminal 14 and positive electrode terminal 15 extended out of the opening part to thereby perfectly seal the coil electrode group 9 and the liquid nonaqueous electrolyte.

The negative electrode terminal is made of, for example, a material which is electrochemically stable at the Li-absorbing/release potential of the negative electrode active material and has conductivity. Specifically, the negative electrode terminal is made of copper, nickel, stainless, aluminum, or aluminum alloys containing elements such as Mg, Ti, Zn, Mn, Fe, Cu and Si. The negative electrode terminal is preferably made of the same material as the negative electrode current collector to reduce the contact resistance with the negative electrode current collector.

The positive electrode terminal is made of, for example, a material having electric stability in a potential range of 3 to 5 V and preferably 3.0 to 4.25 V with respect to a lithium metal and conductivity. Specifically, the positive electrode terminal is formed of aluminum or aluminum alloys containing elements such as Mg, Ti, Zn, Ni, Cr, Mn, Fe, Cu and Si. The positive electrode terminal is preferably made of the same material as the positive electrode current collector to reduce the contact resistance with the positive electrode current collector.

According to these embodiments above, a nonaqueous electrolyte battery can be provided which is improved in cycle life and charge/discharge efficiency.

Fourth Embodiment

Next, a battery pack according to a fourth embodiment will be explained with reference to the drawings. The battery pack comprises one or a plurality of the above nonaqueous electrolyte batteries (unit cells) according to the above third embodiment. When the battery pack comprises a plurality of unit cells, these unit cells are disposed in such a manner that they are electrically connected in series or in parallel.

Figure 8:
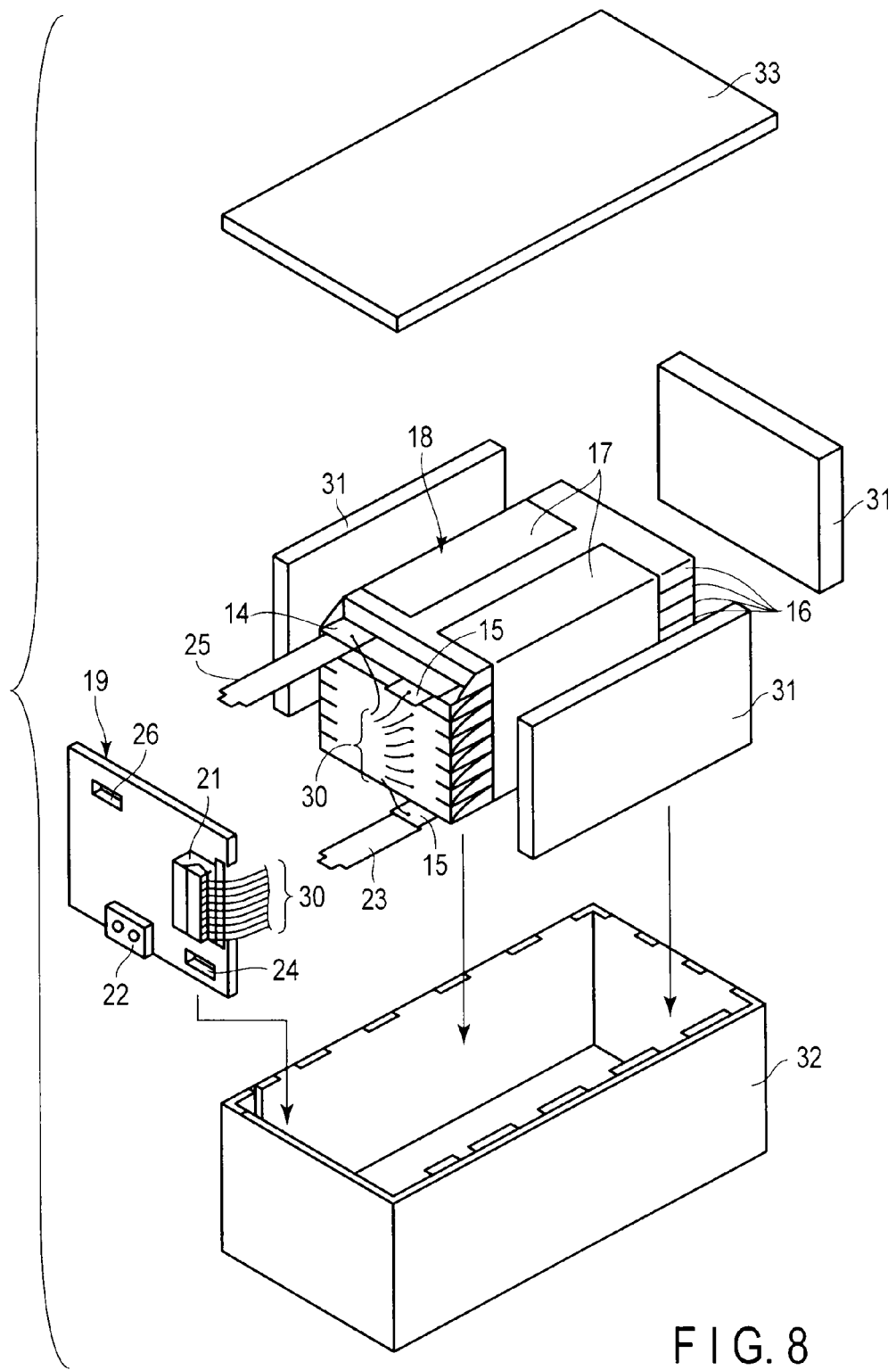
FIG. 8 is an exploded perspective view of a battery pack of a fourth embodiment.

FIGS. 8 and 9 show an example of a battery pack comprising a plurality of flat-type unit cells shown in FIG. 6. FIG. 8 is an exploded perspective view of the battery pack. FIG. 9 is a block diagram showing an electric circuit of the battery pack shown in FIG. 8.

A plurality of unit cells 16 are laminated such that the externally extended negative electrode terminals 14 and positive electrode terminals 15 are arranged in the same direction and fastened with an adhesive tape 17 to thereby configure a battery module 18. These unit cells 16 are electrically connected in series as shown in FIG. 9.

A printed circuit board 19 is disposed opposite to the side surface of the unit cell 16 from which the negative electrode terminal 14 and positive electrode terminal 15 are extended. As shown in FIG. 9, a thermistor 20, a protective circuit 21 and an energizing terminal 22 connected to external devices are mounted on the printed circuit board 19. An insulating plate (not shown) is attached to the surface of the printed circuit board 19 facing the battery module 18 to avoid unnecessary electrical connection with the wiring of the battery module 18.

A positive electrode side lead 23 is connected with the positive electrode terminal 15 positioned on the lowermost layer of the battery module 18 with its tip being inserted into a positive electrode side connector 24 of the printed circuit board 19 for electrical connection. A negative electrode side lead 25 is connected with the negative electrode terminal 14 positioned on the uppermost layer of the battery module 18 with its tip being inserted into a negative electrode side connector 26 of the printed circuit board 19 for electrical connection. These connectors 24 and 26 are connected to a protective circuit 21 through traces 27 and 28 formed on the printed circuit board 19.

The thermistor 20 is used to detect the temperature of the unit cell 16 and the detected signals are transmitted to the protective circuit 21. The protective circuit 21 can shut off a positive side trace 29a and negative side trace 29b between the protective circuit 21 and the energizing terminal 22 connected to external devices, in a predetermined condition. The predetermined condition means, for example, the case where the temperature detected by the thermistor 20 is above a predetermined one. Also, the predetermined condition means, for example, the case of detecting over-charge, over-discharge, over-current and the like of the unit cell 16. The detections of this over-charge and the like are performed for individual unit cells 16 or whole unit cells 16. When individual unit cells 16 are detected, either the voltage of the battery may be detected or the potential of the positive electrode or negative electrode may be detected. In the latter case, a lithium electrode used as a reference electrode is inserted between the individual unit cells 16. In the case of FIGS. 8 and 9, a trace 30 for detecting voltage is connected to each unit cell 16 and the detected signals are transmitted to the protective circuit 21 through these traces 30.

A protective sheet 31 made of a rubber or resin is disposed on each of the three side surfaces of the battery module 18 excluding the side surface from which the positive electrode terminal 15 and negative electrode terminal 14 are projected.

The battery module 18 is accommodated in a receiving container 32 together with each protective sheet 31 and printed circuit board 19. Specifically, the protective sheet 31 is disposed on both inside surfaces in the direction of the long side and on one of the inside surfaces in the direction of the short side of the receiving container 32, and the printed circuit board 19 is disposed on the other inside surface in the direction of the short side. The battery module 18 is positioned in a space enclosed by the protective sheet 31 and the printed circuit board 19. A lid 33 is attached on the upper surface of the receiving container 32.

Here, a thermally contracting tape may be used in place of the adhesive tape 17 to secure the battery module 18. In this case, after the protective sheet is disposed on both sides of the battery module and the thermally contracting tapes are wound around the battery module, the thermally contracting tape is contracted by heating to fasten the battery module.

The structure in which the unit cells 16 are connected in series is shown in FIG. 8 and FIG. 9. However, with regard to these unit cells 16, parallel cell connections may be used to increase the capacity of the battery, or a combination of series connection and parallel connection may also be used. The assembled battery packs may be further connected in series or parallel.

Also, the structure of the battery pack is appropriately changed according to the use. The battery pack in this embodiment is suitably used in applications which need to have excellent cycle characteristics when a large current is extracted. Specific examples of these applications include power sources for digital cameras, and batteries mounted on vehicles such as two- to four-wheel vehicles hybrid electric cars, two- to four-wheel electric cars and assist bicycles. The battery pack is preferably used for batteries mounted on vehicles in particular.

According to these embodiments, a battery pack improved in cycle life and charge/discharge efficiency can be provided.

Fifth Embodiment

In a fifth embodiment, an active material comprising particle of titanium oxide compound having a $TiO_2(B)$ structure and a basic polymer which coats at least a part of the surface of the particle.

Since at least a part of the surface of the titanium oxide compound is coated with the basic polymer in such an active material, solid acid points of the surface of the titanium oxide compound are neutralized, and the catalyst activity is deactivated. As a result, reactivity with the nonaqueous electrolyte is deteriorated, and therefore, deterioration in electrode performance, rise in the internal resistance of the battery and deterioration of the nonaqueous electrolyte can be limited. Therefore, the active material can contribute to an improvement in cycle life of the battery. Also, since solid acid points of the titanium oxide compound in the active material are deactivated, the active material can contribute to an improvement in charge/discharge efficiency due to the reduction in the irreversible capacity of the battery.

The active material in this embodiment can be produced as described in the first method of the second embodiment above. Specifically, the active material can be produced by preparing a dispersion solution by dispersing the titanium oxide compound having a $TiO_2(B)$ structure in the basic polymer solution, thereby forming a titanium oxide compound particle coated with the basic polymer, and by separating the titanium oxide compound coated with the basic polymer from the dispersion solution.

According to the embodiment, an active material can be provided which is used to produce a nonaqueous electrolyte battery improved in cycle life and charge/discharge efficiency.

EXAMPLES

The embodiments will be explained in more detail by way of examples. The identification of the crystal phase and estimation of the crystal structure of a synthesized titanium oxide compound were performed by the powder X-ray diffraction method using Cu-Kα rays, and the specific surface area was measured by the BET method. Also, the composition of a generated product was analyzed by the ICP method, to thereby confirm that an object material was obtained.

<Synthesis of a Titanium Oxide Compound Having a $TiO_2$(B) Structure>

First, a titanium oxide compound having a $TiO_2(B)$ structure was synthesized. Commercially available $K_2Ti_4O_9$ was used as starting material. A powder of $K_2Ti_4O_9$ was washed with distilled water to remove impurities. Then, the powder was added in a 1M hydrochloric acid solution, which was then stirred at 25° C. for 72 hours to operate proton exchange. At this time, the 1 mol/L hydrochloric acid solution was exchanged for a new one every 24 hours.

The suspension solution obtained by the proton exchange has good dispersibility and it is therefore difficult to separate a solid by filtration. Therefore, the suspension was centrifuged to separate a solid from a solvent to obtain a protonic titanate compound (namely, proton-exchanged compound) represented by $H_2Ti_4O_9$.

Then, the proton-exchanged compound $H_2Ti_4O_9$ was burned at 350° C. for 3 hours. The proton-exchanged compound was placed in an electric furnace kept at predetermined temperature, rapidly taken out of the furnace after heated and cooled quickly in air to obtain a precise heat history. This burned product was dried at 80° C. under vacuum for 12 hours to obtain a titanium oxide compound.

The obtained titanium oxide compound was measured by the powder X-ray diffraction using Cu-Kα as the radiation source. As a result, a peak of a (001) plane appeared in the vicinity of 2θ=14°, a peak of a (110) plane appeared in the vicinity of 2θ=25°, a peak of a (002) plane appeared in the vicinity of 2θ=28.5°, and a peak of a (003) plane appeared in the vicinity of 2θ=43.5°. From this fact, it was confirmed that the synthesized titanium oxide compound had a $TiO_2(B)$ crystal structure and is therefore a titanium oxide compound represented by the formula $TiO_2$.

The powder X-ray diffraction measurement was performed in the following manner. First, the object sample was milled until its average particle diameter was reduced to about 5 μm. The milled sample was filled in a 0.2-mm-deep holder part formed on the glass sample plate. Then, a separate glass plate from outside is used to smooth the surface of the sample by sufficiently pressing against the sample. Then, the glass plate filled with the sample is mounted on the powder X-ray diffractometer to obtain a diffraction pattern by using Cu-Kα radiation rays.

Example 1

The produced titanium oxide compound having a $TiO_2(B)$ structure was used to produce an electrode in the procedures as shown in FIG. 2, and this electrode was used to produce an electrochemical measuring cell.

First, a polybenzimidazole (PBI) solution was diluted with N,N-dimethylacetamide to obtain a solution with a concentration of 20 wt %. 10 g of titanium oxide compound was mixed in this solution, which was then stirred. The obtained white dispersion solution was filtered to separate a solid, which was then dried at 140° C. for 2 hours. As a result, a titanium oxide compound coated with PBI was obtained. The content of PBI was 0.03 wt % based on the titanium oxide compound before the coating.

Acetylene black was mixed as a conductive agent in the powder of the resulting coated titanium oxide compound in an amount of 10 wt % based on the titanium oxide compound (excluding the weight of PBI) and the resulting mixture was dispersed in water. Carboxymethyl cellulose (CMC) was added to the resulting dispersion solution as a thickener in an amount of 2.5 wt % based on the titanium oxide compound (excluding the weight of PBI) and mixed. Then, a styrene/butadiene copolymer rubber (SBR) was mixed as a binder with this dispersion solution in an amount of 2.5 wt % based on the titanium oxide compound (excluding the weight of PBI) to obtain a slurry. This slurry was applied to a current collector made of an aluminum foil by using a blade. The applied slurry was dried at 130° C. under vacuum for 12 hours to obtain an electrode.

An electrochemical measuring cell was produced using this electrode, a metal lithium foil as a counter electrode, and a nonaqueous electrolyte. As the nonaqueous electrolyte, a solution obtained by dissolving 1 mol/L of lithium hexafluorophosphate in a mixed solvent of ethylene carbonate and diethyl carbonate (volume ratio: 1:1) was used.

Because a lithium metal is used as the counter electrode, the electrode potential of the titanium oxide compound is nobler than that of the counter electrode. For this, the charge/discharge directions are opposite to those when the titanium oxide compound electrode is used as the negative electrode of a lithium ion battery. Here, to avoid confusion, the charge direction and discharge direction are standardized as follows in this Example: a direction in which lithium ions are inserted into the electrode of the titanium oxide compound is called the charge direction and a direction in which lithium ions are released is called the discharge direction. In this Example, the electrode using the titanium oxide compound is made to work as the positive electrode as mentioned above. However, the electrode using the titanium oxide compound may be made to work as the negative electrode by combining this titanium oxide compound with a positive electrode material.

Example 2

An electrochemical measuring cell was produced in the same manner as in Example 1 except that a polyvinylidene fluoride (PVDF) was used in place of SBR as the binder in an amount of 10 wt % based on the titanium oxide compound (excluding the weight of PBI).

Example 3

An electrochemical measuring cell was produced in the same manner as in Example 1 except that CMC and SBR were not used and PVDF was used as the binder in an amount of 10 wt % based on the titanium oxide compound (excluding the weight of PBI).

Example 4

An electrochemical measuring cell was produced in the same manner as in Example 1 except that CMC was not used.

Example 5

An electrode was produced according to the procedures shown in FIG. 4 by using the titanium oxide compound having a $TiO_2(B)$ structure which was synthesized above, and an electrochemical measuring cell was produced using this electrode.

First, acetylene black was added as a conductive agent in a ratio of 10 wt % to the titanium oxide compound having a $TiO_2(B)$ structure. Also, a solution having a concentration of 20 wt % was obtained by diluting the PBI solution with N,N-dimethylacetamide. This solution was added to the above mixture in a ratio of 30 wt % based on the titanium oxide compound, and the resultant mixture was stirred.

CMC was added as a thickener to this mixture in a ratio of 2.5 wt % based on the titanium oxide compound. Also, a styrene/butadiene copolymer rubber (SBR) was mixed as a binder in a ratio of 2.5 wt % based on the titanium oxide compound. Further, acetylene black was mixed as a conductive agent in a ratio of 10 wt % based on titanium oxide compound to obtain a slurry. Using this slurry, an electrode and an electrochemical measuring cell were produced in the same manner as in Example 1.

Comparative Example 1

Acetylene black was added as a conductive agent in a ratio of 10 wt % to the titanium oxide compound having a $TiO_2(B)$ structure which was synthesized above. This mixture was dispersed in water to obtain a dispersion solution. CMC was added as a thickener to this mixture in a ratio of 2.5 wt % based on the titanium oxide compound. Then, SBR was mixed as a binder in a ratio of 2.5 wt % based on the titanium oxide compound to obtain a slurry. Using this slurry, an electrode containing no basic polymer was produced. The method of producing an electrode was the same as that used in Example 1. Using this electrode, an electrochemical measuring cell was produced in the same manner as in Example 1.

Comparative Example 2

An electrochemical measuring cell was produced in the same manner as in Comparative Example 1 except that CMC was not used.

Comparative Example 3

An electrochemical measuring cell was produced in the same manner as in Comparative Example 1 except that CMC and SBR were not used, and PVDF was used as a binder in a ratio of 10 wt % based on the titanium oxide compound.

<XRD Analysis>

Each electrode produced in Examples 1 to 5 and Comparative Examples 1 to 3 was examined by the powder X-ray diffraction method (XRD). As a result, it was confirmed that the $TiO_2(B)$ crystal structure of the titanium oxide compound was not changed during the production of the electrode. The results of analysis obtained here may be used as the first value to confirm the structural change after charge/discharge.

<Evaluation of Discharge Characteristics>

Using each measuring cell obtained in Examples 1 to 5 and Comparative Examples 1 to 3, an acceleration test of electrode deterioration was performed at a temperature as high as 45° C. A 100-cycle repeat charge/discharge test (a charge/a discharge set in one cycle) was performed to examine discharge capacity retention ratio. The charge/discharge was performed in a voltage range of 1.0 to 3.0 V on metal lithium electrode basis and in the measuring conditions of a discharge current of 0.05 $mA/cm^2$ and 45° C. The first discharge capacity when the discharge current was 0.05 $mA/cm^2$ was set to 100 to calculate the capacity retention ratio. The first charge/discharge efficiency and charge/discharge efficiency after 100 cycles were also measured. Also, the resistance of a battery when the first charge and discharge cycle finished was set to 1.0 to calculate the ratio of rise in battery resistance after 100 cycles from the battery resistance after 100 cycles. Also, the electrode after 100 cycles was observed. These results are shown in FIG. 10 and Table 1.

TABLE 1

| | Basic polymer | Additive | First discharge capacity (mAh/g) | Discharge capacity retention ratio after 100 cycles (%) | First charge/ discharge efficiency (%) | Charge/discharge efficiency after 100 cycles (%) | Resistance rise ratio after 100 cycles | Change of electrode surface after 100 cycles |
|---|---|---|---|---|---|---|---|---|
| Example 1 | PBI | CMC/SBR | 248 | 90.3 | 87.1 | 99.8 | 1.9 | None in particular |
| Example 2 | PBI | CMC/PVDF | 246 | 87.1 | 86.7 | 99.6 | 2.3 | None in particular |
| Example 3 | PBI | PVDF | 241 | 73.3 | 86.5 | 99.3 | 2.5 | None in particular |
| Example 4 | PBI | SBR | 242 | 75.8 | 86.3 | 99.2 | 2.7 | None in particular |
| Example 5 | PBI | CMC/SBR | 246 | 91.5 | 86.9 | 99.7 | 2.0 | None in particular |
| Comparative Example 1 | None | CMC/SBR | 238 | 56.5 | 85.6 | 98.5 | 5.2 | Cracks are observed |
| Comparative Example 2 | None | SBR | 231 | 30.6 | 84.2 | 98.4 | 8.6 | Cracks are observed |
| Comparative Example 3 | None | PVDF | 229 | 24.8 | 83.8 | 98.1 | 10.1 | Float peeling is observed |

Figure 10:
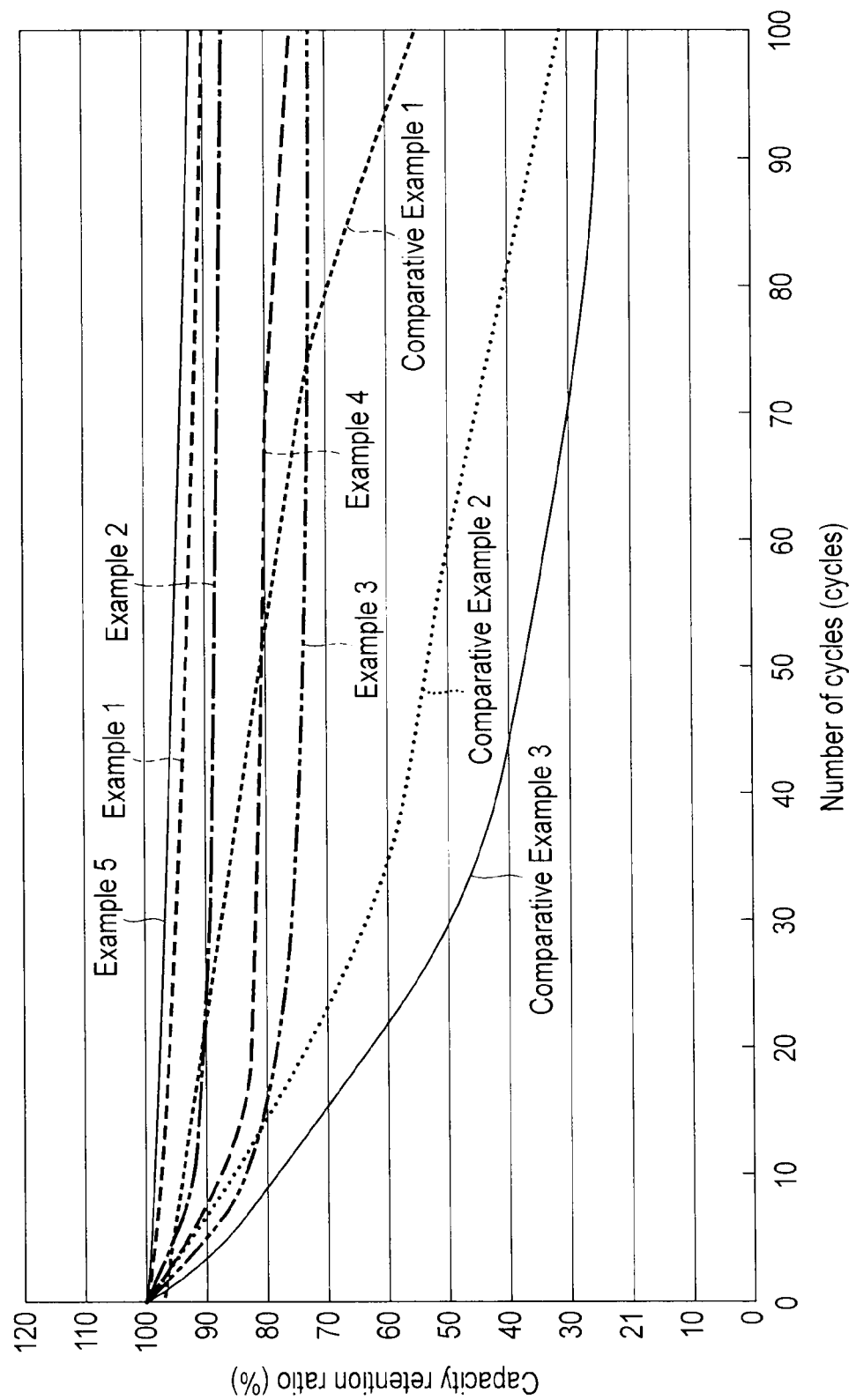
FIG. 10 is a graph showing the capacity retention ratio of each measured cell produced in Examples and Comparative Examples.

As shown in FIG. 10 and Table 1, in Examples 1 to 5, a discharge capacity retention ratio was higher and also, a charge/discharge efficiency was higher, after 100 cycles, as compared with Comparative Examples 1 to 3. It was therefore shown that the reaction between the electrode and the non-aqueous electrolyte was limited, so that deterioration in battery performance was restrained by containing the titanium oxide compound having a $TiO_2(B)$ structure and basic polymer in the electrode.

It was also found that Examples 1 and 5 using both CMC and SBR particularly had higher discharge capacity retention ratio and higher charge/discharge efficiency after 100 cycles and deterioration in battery performance was more restrained by using these CMC and SBR.

Also, in Examples 1 to 5, resistance rise ratio after 100 cycles was reduced, and it was shown that sufficient discharge capacity could be maintained, as compared with Comparative Examples 1 to 3. This showed that the rise in the resistance of the electrode was restrained by containing the titanium oxide compound having a $TiO_2(B)$ structure and basic polymer in the electrode. Also, in Examples 1 to 5 using both CMC and SBR, a resistance rise ratio was particularly lower, it was shown that the effect of more limiting a rise in resistance was obtained by using these CMC and SBR.

In any of Examples 1 to 5, no change of the surface of the electrode after 100 cycles was observed.

On the other hand, in Comparative Example 1 which contained no basic polymer but contained CMC and SBR, a higher capacity retention ratio was exhibited, as compared with Comparative Examples 2 and 3. However, as shown in FIG. 10, the capacity was sharply dropped as the number of cycles was increased. In light of this, when the surface of the electrode after 100 cycles was observed, many fine cracks were observed. Also, it was observed that the active material layer was peeled off from the current collector. It is considered that CMC was decomposed by a solid acidity of the titanium oxide, whereby the binding action of CMC and SBR was reduced.

As in Comparative Example 1, in Comparative Example 2, cracks were observed on the surface of the electrode. In Comparative Example 3 containing neither CMC nor SBR, it was observed that the active material layer was floated on the current collector as if air cells were intervened between the active material layer and the current collector. It is considered that the binding ability of the polyvinylidene fluoride was insufficient for the variation in the crystal lattice size of titanium oxide caused by charge/discharge.

According to the above embodiments or Examples, a battery improved in cycle life, and an electrode and an active material which attain the battery, can be provided.

While certain embodiments have been described, these embodiments have been presented by way of example only, and are not intended to limit the scope of the inventions. Indeed, the novel embodiments described herein may be embodied in a variety of forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A battery electrode comprising:
    an active material comprising a titanium oxide compound having a monoclinic titanium dioxide crystal structure; and
    polybenzimidazole,
    wherein the active material is coated with a layer of the polybenzimidazole, and the layer of the polybenzimidazole is coated with a mixed layer comprising a binder and a conductive agent.

2. The battery electrode according to claim 1, further comprising at least one selected from a cellulose ether compound and a copolymer rubber.

3. A nonaqueous electrolyte battery comprising:
    a negative electrode comprising the battery electrode as claimed in claim 1;
    a positive electrode; and
    a nonaqueous electrolyte.

4. A battery pack comprising the nonaqueous electrolyte battery as claimed in claim 3.

5. An active material comprising:
    a titanium oxide compound particle having a monoclinic titanium dioxide crystal structure;
    a polybenzimidazole coating on at least a part of the surface of the titanium oxide compound particle; and
    a mixed layer comprising a binder and a conductive agent on the polybenzimidazole coating.

6. The battery electrode according to claim 1, wherein the titanium oxide compound having a monoclinic titanium dioxide crystal structure is a compound represented by the formula $Li_xTiO_2$ ($0 \leq x \leq 1$).

7. The battery electrode according to claim 1, wherein the titanium oxide compound having a monoclinic titanium dioxide crystal structure has a form of primary particle or a form of secondary particle.

8. The battery electrode according to claim 1, wherein the titanium oxide compound having a monoclinic titanium dioxide crystal structure has a form of secondary particle.

9. The battery electrode according to claim 7, wherein the polybenzimidazole is bonded and/or adhered to at least a part of surface(s) of either or both primary particle and secondary particle of the titanium oxide compound having a monoclinic titanium dioxide crystal structure.

10. The battery electrode according to claim 1, wherein a content of the polybenzimidazole in the electrode is in a ratio of 0.01 to 10 wt % based on the titanium oxide compound having a monoclinic titanium dioxide crystal structure excluding the weight of the polybenzimidazole.

11. The battery electrode according to claim 2, comprising said cellulose ether compound, and wherein a content of the cellulose ether compound is in a ratio of 0.5 to 5 wt % based on the titanium oxide compound having a monoclinic titanium dioxide crystal structure excluding the weight of the polybenzimidazole.

12. The battery electrode according to claim 2, comprising said copolymer rubber, and wherein a content of the copolymer rubber is in a ratio of 0.5 to 10 wt % based on the titanium oxide compound having a monoclinic titanium dioxide crystal structure excluding the weight of the polybenzimidazole.

13. The battery electrode according to claim 1, wherein said active material further comprises at least one selected from nanotube/nano-fiber type titanium dioxide, lithium titanate having a rhamsdelite structure, and lithium titanate having a spinel structure.

14. The battery electrode according to claim 1, further comprising a conductive agent and a binder, wherein a content of the active material, the polybenzimidazole, the conductive agent and the binder are 68 parts by weight to 96 parts by weight, 0.01 parts by weight to 5 parts by weight, 2 parts by weight to 30 parts by weight and 2 parts by weight to 20 parts by weight, respectively.

15. The nonaqueous electrolyte battery according to claim 3, wherein the positive electrode comprises a positive electrode active material, the positive electrode active material comprising at least one selected from the group consisting of manganese dioxide, iron oxide, copper oxide, nickel oxide, lithium-manganese complex oxide, lithium-nickel complex oxide, lithium-cobalt complex oxide, lithium-nickel-cobalt complex oxide, lithium-manganese-cobalt complex oxide, lithium-manganese-nickel complex oxide having a spinel structure, lithium phosphate having an olivine structure, iron sulfate, vanadium oxide and lithium-nickel-cobalt-manganese complex oxide.

16. The nonaqueous electrolyte battery according to claim 3, wherein the positive electrode comprises a positive electrode active material, the positive electrode active material comprising at least one selected from the group consisting of lithium-manganese complex oxide ($Li_xMn_2O_4$), lithium-nickel complex oxide ($Li_xNiO_2$), lithium-cobalt complex oxide ($Li_xCoO_2$), lithium-nickel-cobalt complex oxide ($LiNi_{1-y}Co_yO_2$), lithium-manganese-nickel complex oxide having a spinel structure ($Li_xMn_{2-y}Ni_yO_4$), lithium-manganese-cobalt complex oxide ($Li_xMn_yCo_{1-y}O_2$), lithium iron phosphate ($Li_xFePO_4$) and lithium-nickel-cobalt-manganese complex oxide, in the formula $0<x\leq1$ and $0<y\leq1$.

17. The active material according to claim 5, wherein said active material further comprises at least one selected from nanotube/nano-fiber type titanium dioxide, lithium titanate having a rhamsdelite structure, and lithium titanate having a spinel structure.

18. The battery electrode according to claim 1, wherein said binder is a cellulose ether compound or a copolymer rubber.

19. The battery electrode according to claim 1, further comprising carboxyethyl cellulose.

* * * * *